US010126995B2

(12) United States Patent
Takemura (10) Patent No.: US 10,126,995 B2
(45) Date of Patent: Nov. 13, 2018

(54) PRINTING SYSTEM CAPABLE OF PRINTING IN ANY ONE OF PLURAL IMAGE FORMING APPARATUSES OVER A NETWORK

(71) Applicants: KABUSHIKI KAISHA TOSHIBA, Tokyo (JP); TOSHIBA TEC KABUSHIKI KAISHA, Tokyo (JP)

(72) Inventor: Minoru Takemura, Sagamihara Kanagawa (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/816,884

(22) Filed: Aug. 3, 2015

(65) Prior Publication Data
US 2017/0039005 A1    Feb. 9, 2017

(51) Int. Cl.
*G06K 15/00* (2006.01)
*G06F 3/12* (2006.01)
(Continued)

(52) U.S. Cl.
CPC ............ *G06F 3/126* (2013.01); *G06F 3/1205* (2013.01); *G06F 3/1222* (2013.01); *G06F 3/1238* (2013.01); *G06F 3/1273* (2013.01); *G06F 3/1291* (2013.01); *H04N 1/2338* (2013.01); *H04N 1/32117* (2013.01); *H04N 1/32523* (2013.01); *H04N 1/32534* (2013.01); *H04N 1/32539* (2013.01); *H04N 2201/3233* (2013.01)

(58) Field of Classification Search
CPC .... G06F 3/126; G06F 3/1238; H04N 1/32539
See application file for complete search history.

(56) References Cited

U.S. PATENT DOCUMENTS

2002/0059489 A1     5/2002  Davis et al.
2004/0218201 A1*  11/2004  Lermant ............... G06F 3/1205
                                                                              358/1.13
(Continued)

OTHER PUBLICATIONS

Extended European Search Report filed Jan. 4, 2017 in counterpart European Patent Application No. 16171949.7 (6 pages).

*Primary Examiner* — King Poon
*Assistant Examiner* — Michael Burleson
(74) *Attorney, Agent, or Firm* — Patterson & Sheridan, LLP (57) ABSTRACT

A printing system according to an embodiment includes a plurality of image forming apparatuses, a server, and a plurality of client terminals. The client terminal displays a setting screen for a user to select, as a print mode, one of a first print mode in which user authentication is not required and a second print mode in which the user authentication is required. When the second print mode is selected as the print mode, the user terminal transmits to the server information related to the user, a print instruction in accordance with the second print mode, and the print job. The server determines whether the user has authority to perform printing in the second print mode. When the user is determined to have the authority, the server transmits the print instruction and the print job to the particular image forming apparatus registered for that user.

13 Claims, 5 Drawing Sheets

(51) Int. Cl.
*H04N 1/23* (2006.01)
*H04N 1/32* (2006.01)

(56) References Cited

U.S. PATENT DOCUMENTS

| | | | |
|---|---|---|---|
| 2010/0238480 A1* | 9/2010 | Fukunishi | G06F 3/1222 |
| | | | 358/1.14 |
| 2014/0055816 A1* | 2/2014 | Sekine | G06F 3/1212 |
| | | | 358/1.15 |
| 2014/0086410 A1* | 3/2014 | Takizawa | H04L 9/28 |
| | | | 380/243 |

* cited by examiner

| USER NAME | USER ID | AUTHORITY TO PERFORM LOCATION-FREE PRINT | IMAGE FORMING APPARATUS FOR LOCATION-FREE PRINTING | AUTHORITY TO PERFORM DIRECT PRINTING | IMAGE FORMING APPARATUS FOR DIRECT PRINTING |
|---|---|---|---|---|---|
| A | z012345x | HAVING | IMAGE FORMING APPARATUS 1A IMAGE FORMING APPARATUS 1B IMAGE FORMING APPARATUS 1C | HAVING | IMAGE FORMING APPARATUS 1B |
| B | r084758y | HAVING | IMAGE FORMING APPARATUS 1A IMAGE FORMING APPARATUS 1B IMAGE FORMING APPARATUS 1C | HAVING | NON-REGISTRATION |
| C | T076493d | HAVING | IMAGE FORMING APPARATUS 1B | NOT HAVING | UNUSABLE |

…

PRINTING SYSTEM CAPABLE OF PRINTING IN ANY ONE OF PLURAL IMAGE FORMING APPARATUSES OVER A NETWORK

FIELD

Embodiments described herein relate generally to a printing system capable of printing in any of a plurality of image forming apparatuses over a network.

BACKGROUND

In a location-free printing system, a user registers a print job using a client terminal in a server. The user may print the print job registered by the user in any one of image forming apparatuses connected over a network, or may remove the print job from the server. In the location-free printing system, since the user may record a print status of each user in the server, a manager of the system may manage a utilization history of the image forming apparatuses by the user by accessing the server.

In a location-free printing system, even when the image forming apparatus close to the client terminal executes the print job, the user needs to perform user authentication in the image forming apparatus and to perform a selection operation and an execution operation of the print job. When the image forming apparatus is directly connected to the client terminal without the server interposed therebetween, it is possible to perform direct printing. That is, since the client terminal transmits the print job, the image forming apparatus may immediately execute the print job.

However, if the direct printing is permitted in the location-free printing system, the manager of the system still needs to collect the utilization history of the image forming apparatuses. The manager must therefore collect the utilization history of by each user from the server and the plurality of image forming apparatuses. Thus, the management becomes complicated.

For this reason, in the location-free printing system according to the related art, there is a problem that direct printing using the image forming apparatus close to the client terminal is not permitted.

DETAILED DESCRIPTION

A printing system according to an embodiment includes a plurality of image forming apparatuses, a server, and a plurality of client terminals. The client terminal displays a setting screen for a user to select, as a print mode, one of a first print mode in which user authentication is not required and a second print mode in which the user authentication is required. When the second print mode is selected as the print mode, the user terminal transmits to the server information related to the user, a print instruction in accordance with the second print mode, and the print job. The server determines whether the user has authority to perform printing in the second print mode. When the user is determined to have the authority, the server transmits the print instruction and the print job to the particular image forming apparatus registered for that user.

Hereinafter, exemplary embodiments will be described with reference to the drawings.

Figure 1:
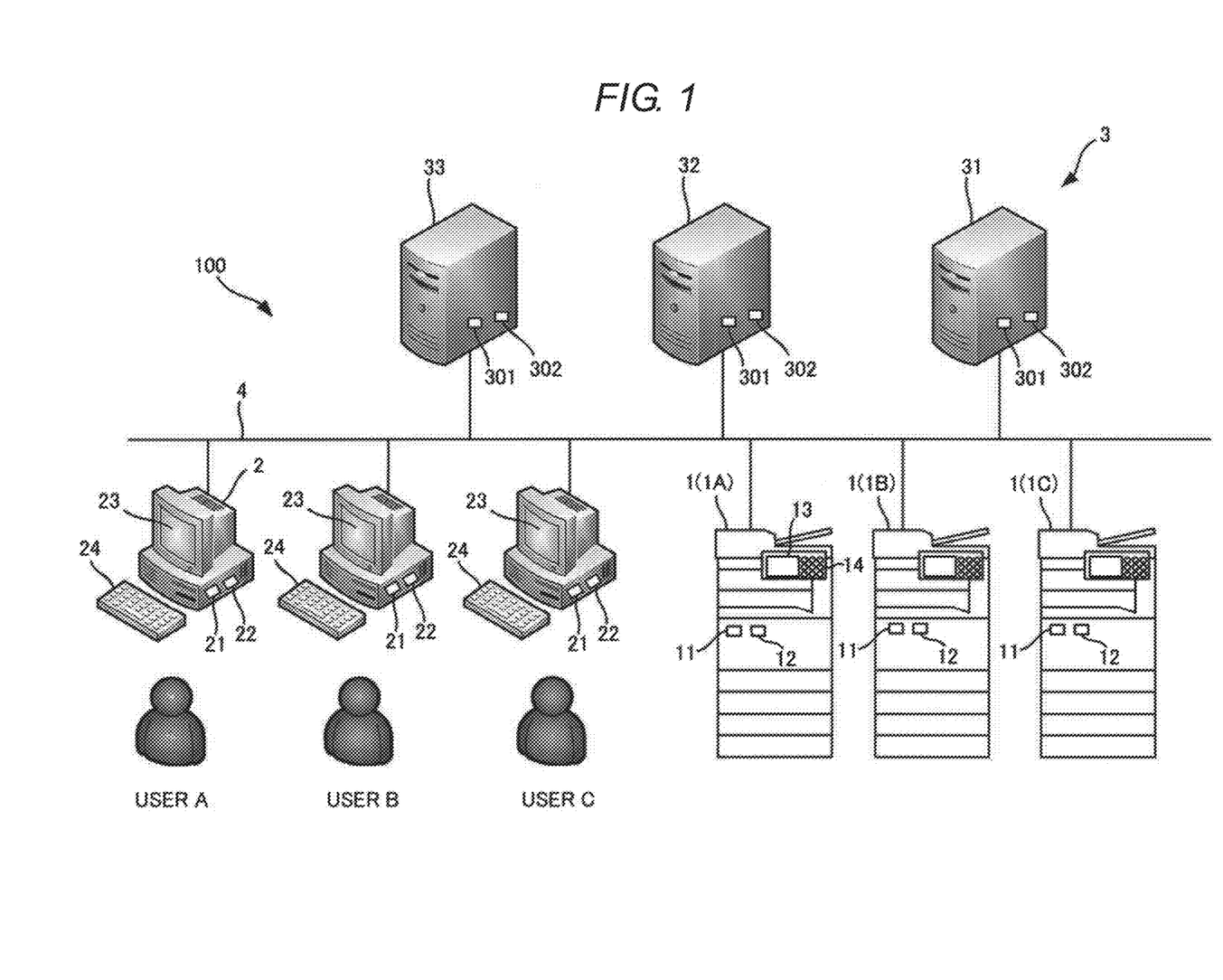
FIG. 1 is a block diagram illustrating a location-free printing system.

FIG. 1 is a block diagram illustrating a location-free printing system 100 (hereinafter, referred to as a printing system 100).

The printing system 100 includes plural image forming apparatuses 1, plural client terminals 2, and plural servers 3 which are connected to each other via a network 4.

The image forming apparatus 1 is, for example, a multi-function peripheral (MFP) having multiple functions such as print, scan and FAX. In the following description, when the image forming apparatuses 1 are not particularly distinguished from each other, each image forming apparatus 1 is described as the image forming apparatus 1, and when the image forming apparatuses 1 are distinguished from each other, the image forming apparatuses 1 are described as image forming apparatuses 1A to 1C. When the users are not distinguished from each other, each user is simply described as the user, and when the users are distinguished from each other, the users are respectively described as users A to C.

The image forming apparatus 1 includes a processor 11, a memory 12, a display 13, an operation unit 14, and a card reader (not illustrated). The operation unit 14 may be a touch panel, and receives an operation input of the user. The card reader reads an ID card and acquires identification information related to the user.

The client terminal 2 is, for example, a personal computer (PC). The client terminal 2 includes a processor 21, a memory 22, a display 23 and an operation unit 24. The operation unit 24 may be a key board, a mouse, a touch panel or the like, and receives an operation input of the user.

The servers 3 include an authentication server 31, a management document system (MDS) server 32, and a log collecting server 33. Each of the servers 31 to 33 includes a processor 301, and a memory 302. The MDS server 32 controls transmission of a print job received from the client terminal 2. The authentication server 31 registers and manages the user, and performs the authentication of the user. The log collecting server 33 acquires an execution history of the print job from the image forming apparatus 1, and records a utilization history of the image forming apparatus 1 for each user. In the present exemplary embodiment, although the function of the server 3 is distributed into three servers 31 to 33, the function of the server 3 may be performed in one server, or may be distributed across a plurality of servers other than three servers.

Figure 2:
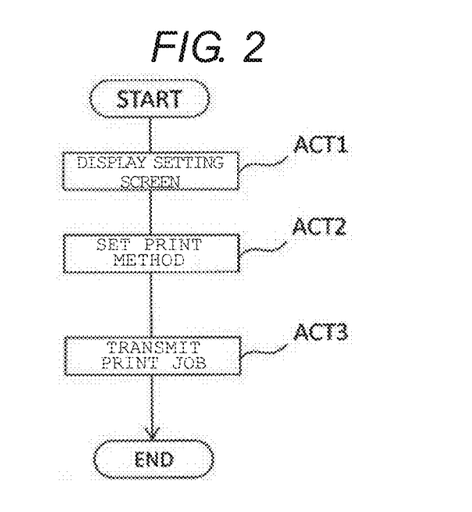
FIG. 2 is a flowchart illustrating an example flow of operations for transmitting a print job, performed by a client terminal.
Figure 3:
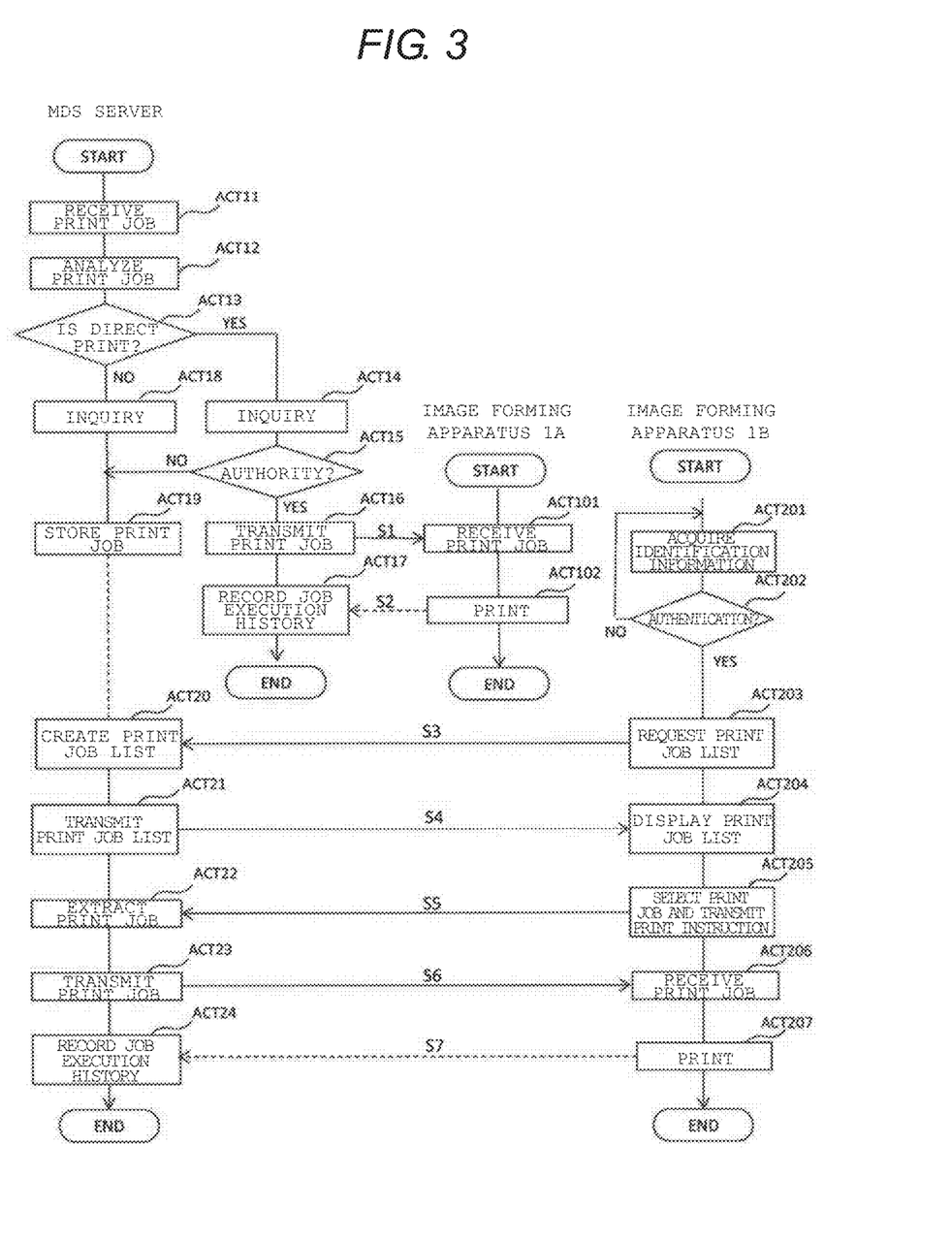
FIG. 3 is a flowchart illustrating an example flow of operations for processing a print job, performed by a server and an image forming apparatus.

Hereinafter, printing processes performed by the printing system 100 will be described with reference to the flowcharts in FIGS. 2 and 3. In the following printing process, the image forming apparatus 1, the client terminal 2, the server 3 perform the respective processes by executing programs stored in the memories 12, 22 and 302 by the processors 11, 21 and 301, respectively.

Figure 4:
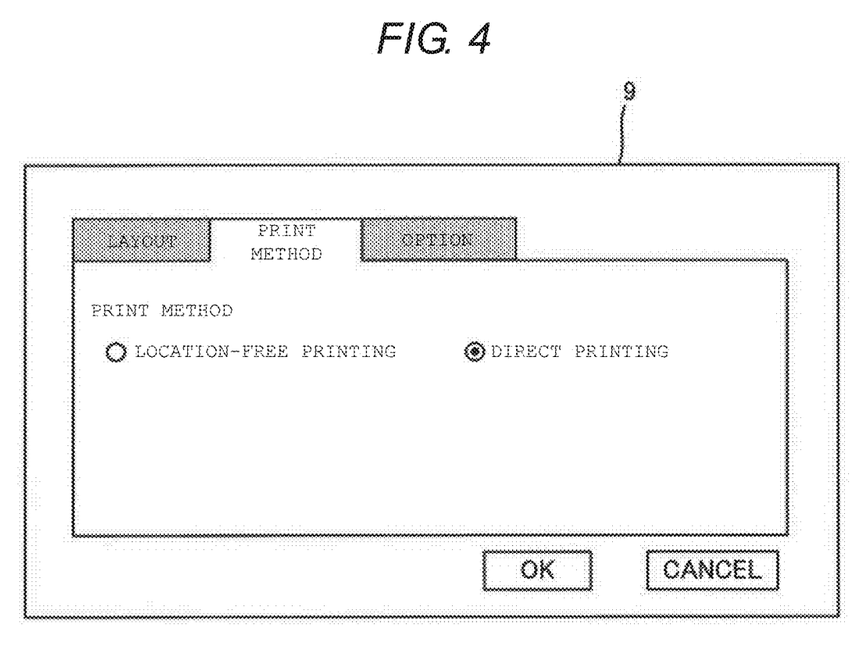
FIG. 4 illustrates an example print setting screen.

The client terminal 2 activates a print driver for performing printing based on the operation input of the user. The client terminal 2 displays a print setting screen 9 illustrated in FIG. 4 (ACT 1). On the print setting screen 9, the user may select a location-free printing (first print mode) or a direct printing (second print mode) as a print method (print mode) in response to an input such as a radio button, a check box or a pull-down menu.

The location-free printing refers to a print method of performing a user authentication in any one of the image forming apparatuses (1A to 1C) over the network 4 in order to execute the print job after the user registers the print job in the server 3 using the client terminal 2.

The direct printing refers to a print method of instructing a specific one of the image forming apparatuses (1A to 1C) which has been previously registered in the client terminal 2 to execute the print job by the user and executing the print job without performing the user authentication.

In other words, the location-free printing refers to a print method in which the user authentication in the image forming apparatus 1 that performs printing is required. The direct printing refers to a print method in which the user authentication in the image forming apparatus 1 that performs printing is not required.

The user, using the client terminal 2, sets the print method (ACT 2). The client terminal 2 may execute the following ACT 3 according to the previously stored setting or the previously registered setting without performing the setting of the print method in accordance with ACTs 1 and 2.

The client terminal 2 transmits the print job—including the identification information related to the user and the print method—to the MDS server 32 (ACT 3). The identification information related to the user and the print method may be transmitted separately from the print job. The same is applicable to the following processes.

Hereinafter, operations for the direct printing performed by the printing system 100 will be first described.

When receiving the print job transmitted from the client terminal 2 (ACT 11), the MDS server 32 analyzes the transmitted print job (ACT 12), and determines the print method (ACT 13). When the print method is the direct printing (ACT 13: YES), the process of ACT 14 is performed.

Figure 5:
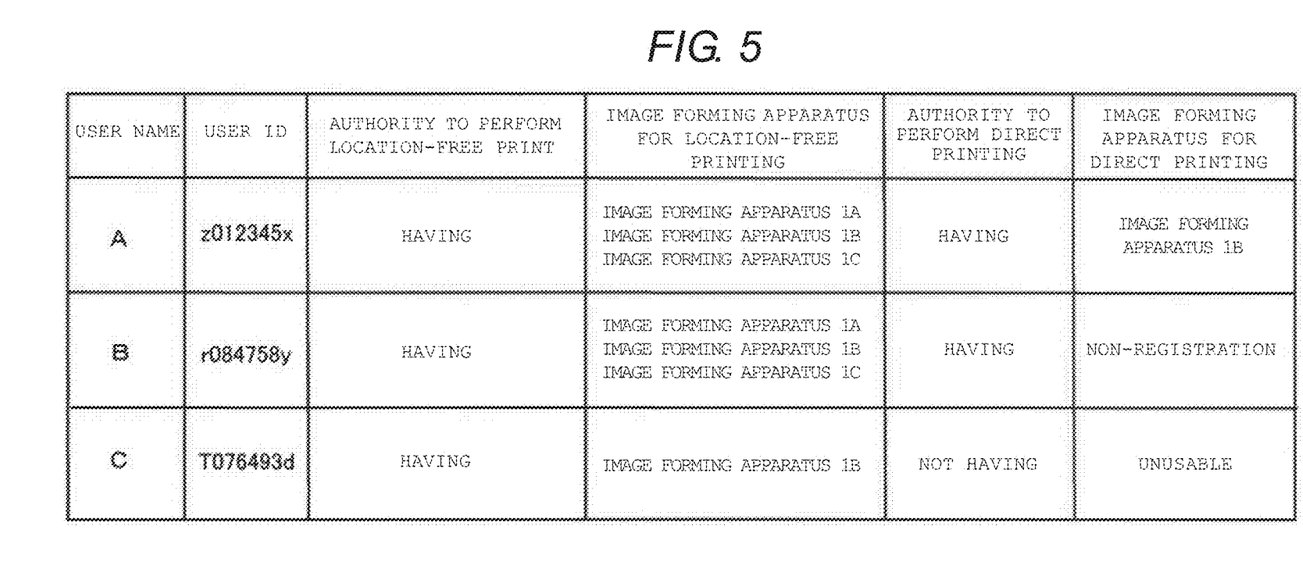
FIG. 5 illustrates an example memory table in which authority and an image forming apparatus are correlated with each user.

In the present exemplary embodiment, as illustrated in FIG. 5, it is assumed that all of the users have the authority to perform the location-free printing. The authentication server 31 stores information related to whether the user has the authority to perform the location-free printing, in connection with the identification information related to the user. The authentication server 31 also stores the identification of particular image forming apparatus(es) capable of executing the location-free printing, in connection with each identification information related to the user. In the illustrated example, it is assumed that, with respect to the image forming apparatus that performs the location-free printing, the image forming apparatuses 1A to 1C are set for the users A and B and the image forming apparatus 1B is set for the user C.

The authentication server 31 stores information related to whether the user has the authority to perform the direct printing, in connection with the identification information related to the user. The authentication server 31 stores the image forming apparatus that performs the direct printing for each user having the authority to perform the direct printing. In the illustrated embodiment, it is assumed that the users A and B have the authority to perform the direct printing and the user C does not have the authority to perform the direct printing. It is assumed that the image forming apparatus 1A that performs the direct printing is set for the user A. It is assumed that the image forming apparatus that performs the direct printing is not set for the user B.

The MDS server 32 transmits the identification information related to the user to the authentication server 31, and inquires whether the user has the authority to perform the direct printing and, if so, the image forming apparatus that performs the direct printing (ACT 14).

The MDS server 32 receives a response from the authentication server 31, and determines whether the user has the authority to perform the direct printing (ACT 15). When the user has the authority to perform the direct printing, and when the image forming apparatus for the direct printing is registered for the user (ACT 15: YES), the MDS server 32 transmits (S1) the print job including the print instruction in accordance with the direct printing to the image forming apparatus (here, it is assumed that the image forming apparatus 1A was previously set) correlated with the user (ACT 16).

The image forming apparatus 1A receives the print job (ACT 101), and performs the direct printing (ACT 102). That is, the print job is executed without performing the user authentication.

The image forming apparatus 1A notifies (S2) the MDS server 32 of the print result, and the MDS server 32 records the execution history of the print job (ACT 17). Identification information related to the image forming apparatus, identification information related to the print job, a print method, an execution time, and contents of the print job such as the number of pages or the number of copies are correlated with the execution history of the print job for each identification information related to the user.

The MDS server 32 stores the execution history of the print job, and transmits the execution history of the print job to the log collecting server 33 at the set timing or when a transmission request of the execution history is received from the log collecting server 33. A manager of the printing system 100 may manage a utilization status of the image forming apparatus by the user by accessing the log collecting server 33.

Hereinafter, operations for the location-free printing performed by the printing system 100 will be described.

When the print method of the print job received from the client terminal 2 is the location-free printing (ACT 13: NO), the MDS server 32 executes ACT 18. In ACT 18, the MDS server 32 transmits the identification information related to the user to the authentication server 31, and inquires of whether the user has the authority to perform the location-free printing, and if so, the image forming apparatus capable of executing the location-free printing (here, it is assumed that the image forming apparatus 1B is set). Although it is assumed that all of the users have the authority to perform the location-free printing, when the user does not have the authority to perform the location-free printing, the process performed by the printing system 100 is ended.

When the print method of the print job received from the client terminal 2 is the direct printing (ACT 13: YES) and the image forming apparatus for the direct printing is not registered for the user (ACT 15: NO), the MDS server 32 executes ACT 19 and the subsequent acts, and executes the location-free printing.

In ACT 19, the MDS server 32 stores the print job.

The user goes to the image forming apparatus 1B having the authority to perform the location-free printing, and performs the user authentication by, for example, holding the ID card that stores the identification information over the card reader. The image forming apparatus 1B acquires the identification information related to the user (ACT 201), and transmits the identification information related to the user to the authentication server 31. The authentication server 31 authenticates whether the user has the authority to perform the location-free printing based on the transmitted identification information (ACT 202).

When the authentication server 31 authenticates the user (ACT 202: YES), the image forming apparatus 1B requests (S3) a print job list which is correlated with the user and is on standby to the MDS server 32. The MDS server 32 makes the print job list by extracting the print jobs of the correlated user from the registered print jobs (ACT 20), and transmits (S4) the print job list to the image forming apparatus 1B (ACT 21). The image forming apparatus 1B displays the received print job list on the display 13 (ACT 204), and prompts the user to select a desired print job for execution. When the print job is selected from the print job list and the execution of the print is instructed by the user, the image forming apparatus 1B transmits (S5) the print instruction (transmission request of the selected print job) to the MDS server 32 (ACT 205). The MDS server 32 selects the print job requested by the image forming apparatus 1B, and transmits (S6) the selected job (ACT 23). The image forming apparatus 1B receives the print job instructed to be executed from the user (ACT 206), and executes the print job (ACT 207). The following process is the same as ACT 17 described above. The image forming apparatus 1B notifies (S7) the MDS server 32 of the print result, and the MDS server 32 records the execution history of the print job (ACT 24).

Since the printing system 100 may execute both of the location-free printing and the direct printing, the convenience of the user is improved.

As described above, according to the technology described in the present disclosure, it is possible to provide the location-free printing system capable of executing both of the location-free printing and the direct printing.

While certain embodiments have been described, these embodiments have been presented by way of example only, and are not intended to limit the scope of invention. Indeed, the novel apparatus, methods and system described herein may be embodied in a variety of other forms; furthermore, various omissions, substitutions and changes in the form of the apparatus, methods and system described herein may be made without departing from the spirit of the inventions. The accompanying claims and their equivalents are intended to cover such forms or modifications as would fall within the scope and spirit of the inventions.

What is claimed is:

1. A printing system comprising:
a plurality of image forming apparatuses in communication with a network, each configured to print a print job received over the network;
at least one server in communication with the network; and
a plurality of client terminals in communication with the network, each client terminal configured to:
display a setting screen for a user to select, as a print mode, one of a first print mode in which the image forming apparatus that is to perform printing of a print job belonging to the user receives authentication information corresponding to the user before performing the printing, and a second print mode in which the image forming apparatus that is to perform printing of the print job does not receive authentication information corresponding to the user before performing the printing, and
when the first print mode is selected as the print mode, transmit to the server over the network, the print job including identification information related to the user and a print instruction to print in accordance with the first print mode;
when the second print mode is selected as the print mode, transmit to the server over the network, the print job including identification information related to the user and a print instruction to print in accordance with the second print mode;
wherein the at least one server is configured to:
when the print job including the print instruction to print in accordance with the first print mode is received:
determine, based on the identification information related to the user included in the received print job, whether the user has authority to perform printing in the first print mode, and
when the user is determined to have the authority to perform printing in the first print mode:
store the print job,
receive, from one of the image forming apparatuses that received the authentication information corresponding to the user, a request for the print job, and
in response to the request, transmit the print job to the same image forming apparatus, and
when the print job including the print instruction to print in accordance with the second print mode is received:
determine, based on the identification information related to the user included in the received print job, whether the user has authority to perform printing in the second print mode,
and
when the user is determined to have the authority to perform printing in the second print mode, transmit the print job to a particular image forming apparatus of the plurality of image forming apparatuses that is registered to perform printing in the second print mode for that user.

2. The system according to claim 1, wherein when the print instruction in accordance with the second print mode of the print job is received, and when the user is determined to have the authority to perform printing in the second mode and none of the plurality of image forming apparatuses that perform printing in the second print mode are registered for that user, the server is further configured to:
determine, based on the identification information related to the user included in the received print job, whether the user has authority to perform printing in the first print mode, and
when the user is determined to have the authority to perform printing in the first print mode, receive, from one of the image forming apparatuses that received the authentication information corresponding to the user, a request for the print job, and in response thereto, transmit the print job to the same image forming apparatus.

3. The system according to claim 1, wherein the server is further configured to acquire an execution history of printing in the first print mode and printing in the second print mode from each of the plurality of image forming apparatuses.

4. The system according to claim 1, wherein the particular image forming apparatus receives the print job including the print instruction to print in accordance with the second print mode and prints the print job.

5. The system according to claim 1, wherein the server is further configured to:

when the print job including the print instruction in accordance with the second print mode is received and when the user is determined to not have the authority to perform printing in the second mode:
   store the print job,
   receive, from one of the image forming apparatuses that received the authentication information corresponding to the user, a request for the print job, and
   in response to the request, transmit the print job to the same image forming apparatus.

6. A server for managing print jobs in a printing system, the server comprising:
a memory; and
a processor, wherein
the server is configured to:
   communicate over a network with a plurality of image forming apparatuses each configured to print a print job received over the network in one of a first print mode in which authentication information corresponding to a user who requests the print job is received in the image forming apparatus that is to perform printing of the print job, and a second print mode in which the authentication information corresponding to the user who requests the print job is not received in the image forming apparatus that is to perform printing of the print job,
   communicate over the network with a plurality of client terminals,
   receive from one of the client terminals a print job including identification information related to the user and a print instruction to print in accordance with the first print mode or the second print mode,
   when the print job including the print instruction to print in accordance with the first print mode is received:
      determine, based on the identification information related to the user included in the received print job, whether the user has authority to perform printing in the first print mode, and
      when the user is determined to have the authority to perform printing in the first print mode:
         store the print job,
         receive, from one of the image forming apparatuses that received the authentication information corresponding to the user, a request for the print job, and
         in response to the request, transmit the print job to the same image forming apparatus, and
   when the print job including the print instruction to print in accordance with the second print mode is received:
      determine, based on the received identification information related to the user included in the received print job, whether the user has authority to perform printing in the second print mode, and
      when the user is determined to have the authority to perform printing in the second mode, transmit the print job to a particular image forming apparatus of the plurality of image forming apparatuses that is registered to perform printing in the second print mode for that user.

7. The server according to claim 6, wherein:
when the server receives the print instruction in accordance with the second print mode and when the user is determined to have the authority to perform printing in the second mode and none of the plurality of image forming apparatuses that perform printing in the second print mode are registered for that user, the server is further configured to:
   determine, based on the identification information related to the user included in the received print job, whether the user has authority to perform printing in the first print mode, and
   when the user is determined to have the authority to perform printing in the first print mode, receive, from one of the image forming apparatuses that received the authentication information corresponding to the user, a request for the print job, and in response thereto, transmit the print job to the same image forming apparatus.

8. The server according to claim 6, wherein the server is further configured to acquire an execution history of printing in the first print mode and printing in the second print mode from each of the plurality of image forming apparatuses.

9. The server according to claim 6, wherein the server is further configured to:
when the print job including the print instruction in accordance with the second print mode is received and when the user is determined to not have the authority to perform printing in the second mode:
   store the print job,
   receive, from one of the image forming apparatuses that received the authentication information corresponding to the user, a request for the print job, and
   in response to the request, transmit the print job to the same image forming apparatus.

10. A method of managing direct and indirect printing in a printing system comprising a plurality of image forming apparatuses in communication with a network, at least one server in communication with the network, and a plurality of client terminals in communication with the network, the method comprising the steps of:
   displaying, on at least one of the client terminals, a setting screen for a user to select, as a print mode, one of a first print mode in which the image forming apparatus that is to perform printing of a print job belonging to the user receives authentication information corresponding to the user before performing the printing, and a second print mode in which the image forming apparatus that is to perform printing of the print job does not receive authentication information corresponding to the user before performing the printing;
   accepting the user selection of the print mode;
   when the first print mode is selected as the print mode, transmit to the server over the network, the print job including identification information related to the user and a print instruction to print in accordance with the first print mode;
   when the second print mode is selected as the print mode, transmitting to the server over the network, the print job including identification information related to the user and a print instruction to print in accordance with the second print mode;
   when the print job including the print instruction to print in accordance with the first print mode is received:
      determining, based on the identification information related to the user included in the received print job, whether the user has authority to perform printing in the first print mode; and
      when the user is determined to have the authority to perform printing in the first print mode:
         storing the print job, receiving, from one of the image forming apparatuses that received the authentication information corresponding to the user, a request for the print job, and in response to the request, transmitting the print job to the same image forming apparatus; and when the print job including the print instruction to print in accordance with the second print mode is received:

determining, based on the identification information related to the user included in the received print job, whether the user has authority to perform printing in the second print mode;

identifying, for each user having the authority, a particular one or more of the plurality of image forming apparatuses registered to perform printing in the second print mode for that user;

when the user is determined to have the authority to perform printing in the second mode, transmitting and the print job to the particular image forming apparatus registered to perform printing in the second print mode for that user; and executing the print job in the particular image forming apparatus registered to perform printing in the second print mode for that user.

11. The method according to claim 10, further comprising the steps of:

when the print instruction in accordance with the second print mode of the print job is received, and when the user is determined to have the authority to perform printing in the second mode and none of the plurality of image forming apparatuses that perform printing in the second print mode are registered for that user, determining, based on the identification information related to the user included in the received print job, whether the user has authority to perform printing in the first print mode;

when the user is determined to have the authority to perform printing in the first print mode, receiving, from one of the image forming apparatuses that received the authentication information corresponding to the user, a request for the print job; and in response to the request, transmitting the print job to the same image forming apparatus.

12. The method according to claim 10, further comprising:

acquiring an execution history of printing in the first print mode and printing in the second print mode from each of the plurality of image forming apparatuses.

13. The method according to claim 10, the method further comprising the steps of:

when the print job including the print instruction in accordance with the second print mode is received and when the user is determined to not have the authority to perform printing in the second mode:

storing the print job, receiving, from one of the image forming apparatuses that received the authentication information corresponding to the user, a request for the print job, and in response to the request, transmitting the print job to the same image forming apparatus.

* * * * *